(12) United States Patent
Niisato et al.

(10) Patent No.: US 8,543,706 B2
(45) Date of Patent: Sep. 24, 2013

(54) COMMUNICATION MODULE FOR CONNECTING APPLICATION PROGRAM TO VIRTUAL PRIVATE NETWORK

(75) Inventors: Hirotaka Niisato, Tokyo (JP); Atsuki Ishida, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 229 days.

(21) Appl. No.: 12/301,990

(22) PCT Filed: May 23, 2007

(86) PCT No.: PCT/JP2007/060556
§ 371 (c)(1),
(2), (4) Date: May 11, 2010

(87) PCT Pub. No.: WO2007/136101
PCT Pub. Date: Nov. 29, 2007

(65) Prior Publication Data
US 2010/0257226 A1 Oct. 7, 2010

(30) Foreign Application Priority Data
May 23, 2006 (JP) .................. 2006-143314

(51) Int. Cl.
*G06F 15/16* (2006.01)
(52) U.S. Cl.
USPC ........................................ 709/227
(58) Field of Classification Search
USPC ........................................ 709/227
See application file for complete search history.

(56) References Cited

U.S. PATENT DOCUMENTS 7,126,952 B2 * 10/2006 Hooper et al. .......... 370/401
7,639,715 B1 * 12/2009 O'Neil et al. ............. 370/474
2003/0225607 A1 * 12/2003 Kopunovic et al. ......... 705/9
2005/0111385 A1 * 5/2005 Choi ....................... 370/254
2006/0070066 A1 * 3/2006 Grobman ................... 718/1
2006/0146837 A1 * 7/2006 Atsuki et al. ............. 370/400
2009/0019141 A1 * 1/2009 Bush et al. ................ 709/223

FOREIGN PATENT DOCUMENTS

| EP | 1575230 A1 * | 9/2005 |
|---|---|---|
| JP | 2004194313 A | 7/2004 |
| JP | 2007-221740 | 8/2007 |

(Continued)

OTHER PUBLICATIONS

European Patent Office, Supplementary European Search Report, European Patent Application No. 07743990.9, dated Dec. 22, 2009, 6 pages.

(Continued)

*Primary Examiner* — Alicia Baturay
(74) *Attorney, Agent, or Firm* — Woodcock Washburn LLP

(57) ABSTRACT

Bidirectional communication is performed by an application employing particular communication protocols without depending on any specific network environment enabled by an OS and the like. There is provided a communication module installed in a client apparatus for connecting an application software program to a virtual network via a server on the Internet. This module interposes between the application software program in a computer and a group of local communication protocol stacks of an operating system installed in the computer; retains a virtual network address for the application software program; performs the tunneling processing on packets from the application software program to the virtual network to thereby pass the processed packets to the server through the local communication protocol stacks; and is provided with Layer 2, 3 and 4 protocol stacks that are independent of a group of local communication protocol stacks.

12 Claims, 11 Drawing Sheets

(56) References Cited

FOREIGN PATENT DOCUMENTS

| WO | WO 03102806 A1 | | 12/2003 |
|---|---|---|---|
| WO | WO 3102806 A1 | * | 12/2003 |
| WO | WO 2005/114926 A1 | | 12/2005 |
| WO | WO 2007/136101 | | 11/2007 |

OTHER PUBLICATIONS

VMWare, "Workstation 5 Powerful Virtual Machine Software for the Technical Professional user's manual (online)," Sep. 16, 2005, URL: www.vmware.com/pdf/ws5_manual.pdf.
D4: K. Hamzeh et al., "Point-to-Point Tunneling Protocol (PPTP)", Network Working Group, RFC: 2637, Jul. 1, 1999 XP015008420, ISSN: 0000-0003.
D5: Ganis, M: "An IPv6-to-IPv4 Web Proxy", SysAdminMag.com, Sep. 22, 2005, XP000863981.
Communication pursuant to Article 94(3) EPC for EP 07743990.9, mailed Jun. 20, 2011.
Ely et al., "Alpine: A User-Level Infrastructure for Network Protocol Development", Proceedings of $3^{rd}$ Usenix Symposium on Internet Technologies and Systems, Mar. 28, 2001, 171-183.
European Patent Application No. 07743990: Communication pursuant to Article 94(3) EPC dated May 7, 2013, 7 pages.
Pradhan et al., "Daytona: A User-Level TCP Stack", 2002, http://nms.csail.mit.edu/~kandula/data/daytona.pdf, retrieved Jun. 20, 2008, 1-8.
Thekkath et al., "Implementing Network Protocols at User Level", IEEE/ACM Transactions on Networking, Oct. 1, 1993, vol. 1, No. 5, 554-565.

* cited by examiner

COMMUNICATION MODULE FOR CONNECTING APPLICATION PROGRAM TO VIRTUAL PRIVATE NETWORK

CROSS REFERENCE TO RELATED APPLICATIONS

This application claims priority under 35 U.S.C. 119 based upon Japanese Patent Application Serial No. 2006-143314, filed on May 23, 2006. The entire disclosures of the aforesaid applications are incorporated herein by reference.

FIELD OF THE INVENTION

This invention relates to a communication module installed in a terminal, which communication module for connecting a client apparatus and a server which enable bidirectional communication among such terminals belonging to different LANs via Internet in a highly secure manner by relatively simple means under a current infrastructure environment widely employing the IPv4 (Internet Protocol version 4).

BACKGROUND OF THE INVENTION

In a service delivery environment through public networks centered around the Internet, values of all information are generally concentrated on a server side rather than a client side.

In other words, each client (terminal device) is basically a mere viewer browsing information on the Internet. Each client issues requests for various information to the Internet, which in return may obtain such information from the client. It means that all information is collected on the Internet and it only offers formulaic information unidirectionally. For this reason, it is difficult for manufacturers of client terminal devices to create an added value.

In order to change such a circumstance, the server-client relationship must be reversed by inverting the access direction. That is, when there is a home network connected to the Internet, it is necessary to create an environment for allowing the Internet to access the home network to receive a service therefrom.

To achieve this, each apparatus connected to the local network must be uniquely identifiable from the Internet, and intra-home routing and security problems must be solved. One of the technologies for addressing this issue is the IPv6 (Internet Protocol version 6).

However, considering the environment surrounding the current carriers and Internet service providers in Japan, it may take considerably longer before IPv6 becomes widespread. For example, the currently used IPv4 machines need at least 2 to 3 years for their depreciation and IPv6 service is offered on a test basis only.

In order to immediately provide an IPv6-enabled network, manufacturers must expand their business to ISP level services, which is very costly and unrealistic for most of them. Since existing home networks vary broadly in their structures and also in connection mechanisms depending on the carrier and ISP, there is a need for a mechanism for absorbing all these differences to achieve the IPv6 environment with a standardized approach.

In the conventional IPv4 environment, the following problems arise in an attempt to achieve such bidirectional accesses as would be possible in IPv6 networks between the home network and the Internet.

For example, when installing network home appliances at home in the current IPv4 environment, each of the appliances should be connected to a router connected to the Internet through the home network. Accordingly, an IP address of the respective network home appliance becomes a private address and cannot be accessed from non-home network.

Thus an access to the network home appliances has been conventionally achieved by employing a dedicated router capable of controlling the network home appliances, or by first accumulating information for controlling the network home appliances at a data center provided on the Internet and then retrieving the information by performing polling from the network home appliances.

However, such a dedicated router compromises the system's versatility and increases the cost. Also when retrieving the control information by polling, real time accesses cannot be made and the network and server load increases.

In order to overcome these challenges, a network connection method and a relay device were disclosed by the present assignee in International Application No. PCT/JP2005/9280 (Publication No. WO2005/114926), filed on May 20, 2005, the disclosure of which is incorporated herein by reference. The present invention enables bidirectional communication between the home network and the Internet by relatively simple means by establishing a tunneling connection session between a computer system in a private network and an InterServer on the Internet.

Particularly, one or more of the relay devices disclosed in the Publication No. WO2005/114926 are installed as one or more programs in the client apparatus and each has an interface recognized as a virtual device driver. Such a structure may allow the communication described above with relatively simple configuration. However, the technique disclosed in the above publication communicates via an OS (operating system) installed in the client apparatus and does not allow communication by applications using a protocol whose protocol stack does not exist in the OS.

For example, under an OS with no IPv6 protocol available, it may not be possible to use applications which communicate with IPv6.

Considering the above situation, the purpose of the present invention is to provide a communication module for enabling applications to use a particular communication protocol thereby to perform bidirectional communication utilizing a virtual network without relying on a particular network environment such as an OS.

SUMMARY OF THE INVENTION

In order to achieve the above object, according to a principal aspect of the present invention, there is provided a communication module installed in a client apparatus on a local network for connecting an application software program installed in the client apparatus to a virtual network via a server on the Internet, wherein the communication module interposes between the application software program and a group of local communication protocol stacks of an operating system installed in the client apparatus; retains a virtual network address for the application software program; performs the tunneling processing on packets from the application software program to the virtual network to thereby pass the processed packets to the server through the local communication protocol stacks; and wherein the communication module is provided with protocol stacks required for said application software program to communicate via the virtual network, independently of the group of local communication protocol stacks.

According to such a structure in which Layer 2, 3 and 4 protocol stacks are independently provided of the local communication protocol stacks of the client apparatus, network applications (such as the above application software program) may be created for communicating independently of any particular network environment determined by the OS and the like. In other words, even on an OS without a particular protocol stack installed, application software using that particular protocol may be executed. For example, even in an OS environment without the IPv6 protocol, an IPv6 address may be retained for communication via the virtual network per each application software.

According to one embodiment of the present invention, the communication module stores a global address of the server on the Internet; establishes a tunneling connection between the communication module and the server based on the global address of the server; captures a request packet from the application software program, capsulates the captured request packet after adding to the packet the virtual network address of the application software program as an originating address to thereby send the capsulated packet to the server via the tunneling connection; and decapsulates a packet addressed to the communication module itself received through the local communication protocol stacks to pass the decapsulated packet to the application software program. In this case, the communication module preferably connects to a tunneling mediation server provided on the Internet, and receives the global address of the server from the tunneling mediation server. In addition, the communication module preferably receives, from the server on the Internet, and retains IP and MAC addresses for the virtual network for the application software program.

According to another embodiment, the communication module is preferably provided as a library program callable from the application software program.

According to yet another embodiment, the communication module has an initialization section configured to generate all of the Layer 2, 3 and 4 protocol stacks when establishing a Layer 2 connection with the server, and generate only the Layer 3 and 4 protocol stacks, but not the Layer 2 protocol stack when establishing a Layer 3 connection with the server.

According to a second principal aspect of the present invention, there is provided an application software program executed on a computer for connecting to the Internet to perform predetermined processing, provided with an instruction for calling and incorporating the communication module of Claim 1 as a communication interface, wherein the application software program is configured to has an IP address independent of the computer.

According to one embodiment, the application software program is a VoIP program for connecting to a virtual network via a server on the Internet.

According to another embodiment, the application software program is a proxy for connecting a client apparatus to a virtual network via a server on the Internet.

It is to be noted that other characteristics and marked effects of the present invention will be appreciated to those skilled in the art upon referring to the following detailed description of the preferred embodiments and the accompanying drawings.

DETAILED DESCRIPTION OF THE INVENTION

One embodiment of the present invention will be described below in accordance with accompanying drawings.

Figure 1:
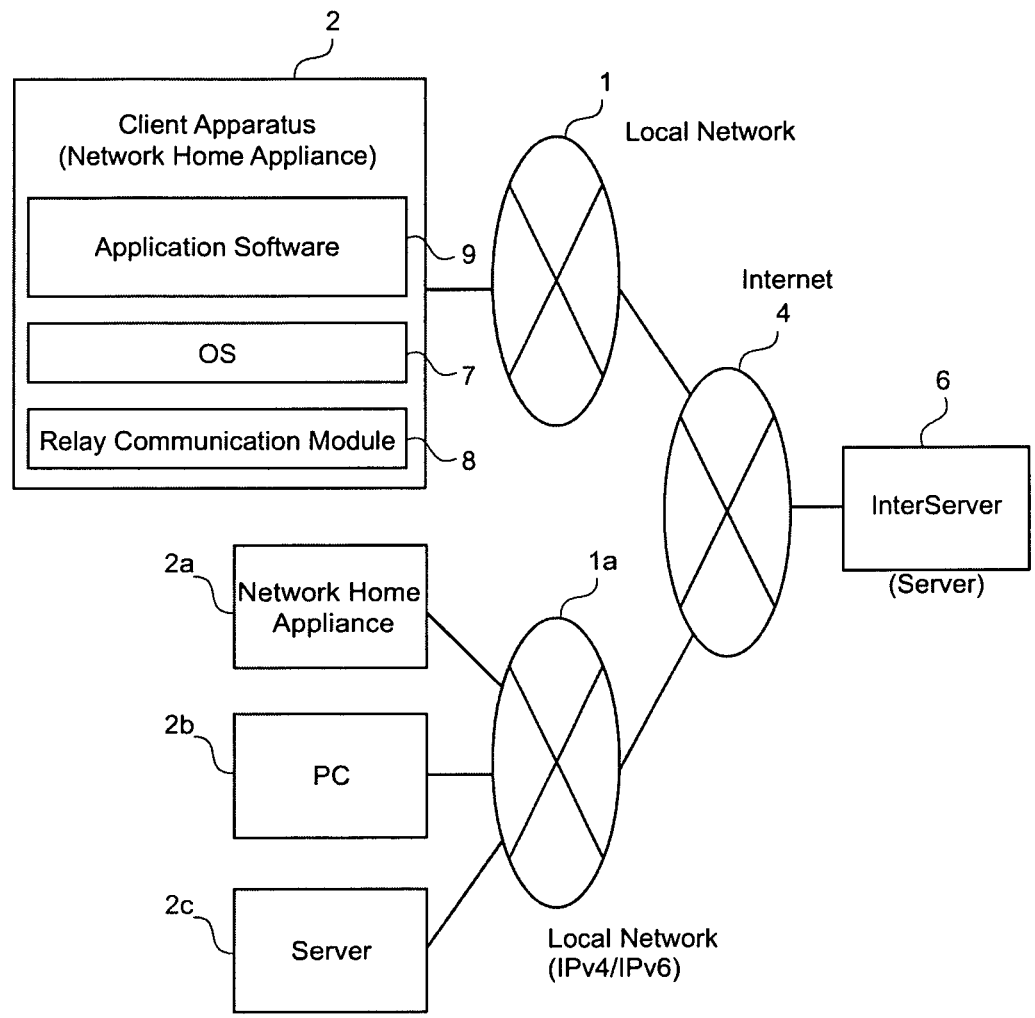
FIG. 1 is a diagram showing an example network structure according to one embodiment of the present invention.

FIG. 1 is a diagram showing an example of network structure according to this embodiment.

Indicated with a reference number 1 in this figure is a local network defined by a connection with client apparatus 2 of various types communicating with IPv4 (a first communication protocol). This local network 1 is, for example, composed of a LAN implemented in each home. Also installed in each client apparatus 2 are an OS (operating system) 7, relay communication module 8 as a communication module of the present invention, and an application software program 9 (for example, Internet browser) for performing communication.

This local network 1 is connected to an Internet 4 (not shown in figures) via a communication carrier/ISP. In this Internet 4, IPv4 is used for communication.

Connected to this Internet 4 is an InterServer 6 (a "server" of this invention) for controlling communication of the network home appliance 2 on the local network 1. This InterServer 6 has functions for mediating connections between the application software program 9 installed in the network home appliance 2, and all network home appliances 2a, personal computers 2b and servers 2c on the Internet 4 or on other home/global network 1a, as will be described in greater detail herein below.

Here, the relay communication module 8 and the InterServer 6 are intended to be provided or produced by the same manufacturer or under a unified standard, and are designed to interface with each other. As described below, the InterServer 6 provides the relay communication module 8 with a virtual private/global address with IPv4 to enable communication using a TCP/IP session with tunneling connection established on the InterServer 6 regardless of its carrier and ISP.

The present invention is characterized by connecting a virtual network (or a real network) with the application software program 9 without using the OS of the client apparatus therebetween. Namely, in order to achieve the above objective, the application software program 9 itself is adapted such that it can retain an IPv4 or IPv6 address and a MAC address on the virtual network (or real network). An embodiment of a structure and its operations enabling the above will be discussed below.

Figure 2:
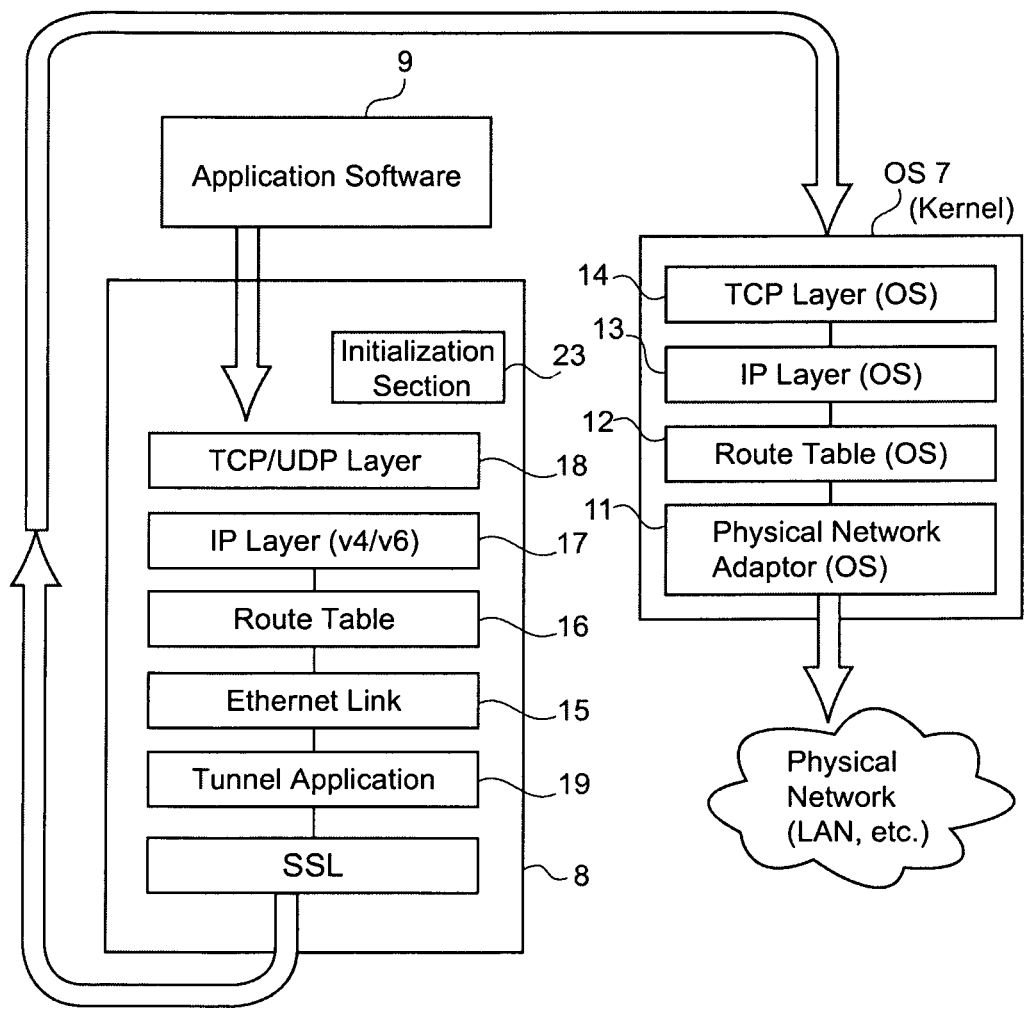
FIG. 2 is a schematic structural view showing a relay communication module according to the one embodiment.

FIG. 2 is a functional block diagram showing the OS 7, relay communication module 8 and application 9 installed in the client apparatus 2. It should be noted that only the structures related to features of the present invention are depicted and explained herein and details relating to other structures which are expected to be included are omitted.

In FIG. 2, the OS 7 is showing a local communication protocol stack group included in a kernel, in which physical network adaptor (Layers 1, 2) 11 for controlling a network card, route table 12, IP layer (Layer 3) 13 and TCP layer (Layer 4) 14 are configured hierarchically.

On the other hand, the relay communication module 8 is provided with protocol stacks: Layer 2 (Ethernet Link) 15, route table 16, Layer 3 (IP layer (IPv4/v6)) 17 and Layer 4 (TCP/UDP layer) 18, each in compliance with RFC and independent of the OS 7, to thereby allow creation of the application software program 9 independent of any particular network environment. This relay communication module 8 further has a tunneling application 19. As discussed in detail below, this tunneling application 19 has functions to perform processing on packets received from the Ethernet® link layer 15 to prevent congestion due to the TCP-over-TCP problem and a reduction in communication band, and send the packets to the InterServer 6 with the tunneling connection. Although a SSL is shown in the figure, a structure without this SSL may also be possible.

The above group of software constituting the relay communication module 8 is provided as a library and is adapted to be read by the application software program 9 when necessary and utilized as a communication interface of this application software program 9. Provided as a library as described above, the relay communication module 8 allows to minimize alteration of the respective application software program 9.

Figure 3:
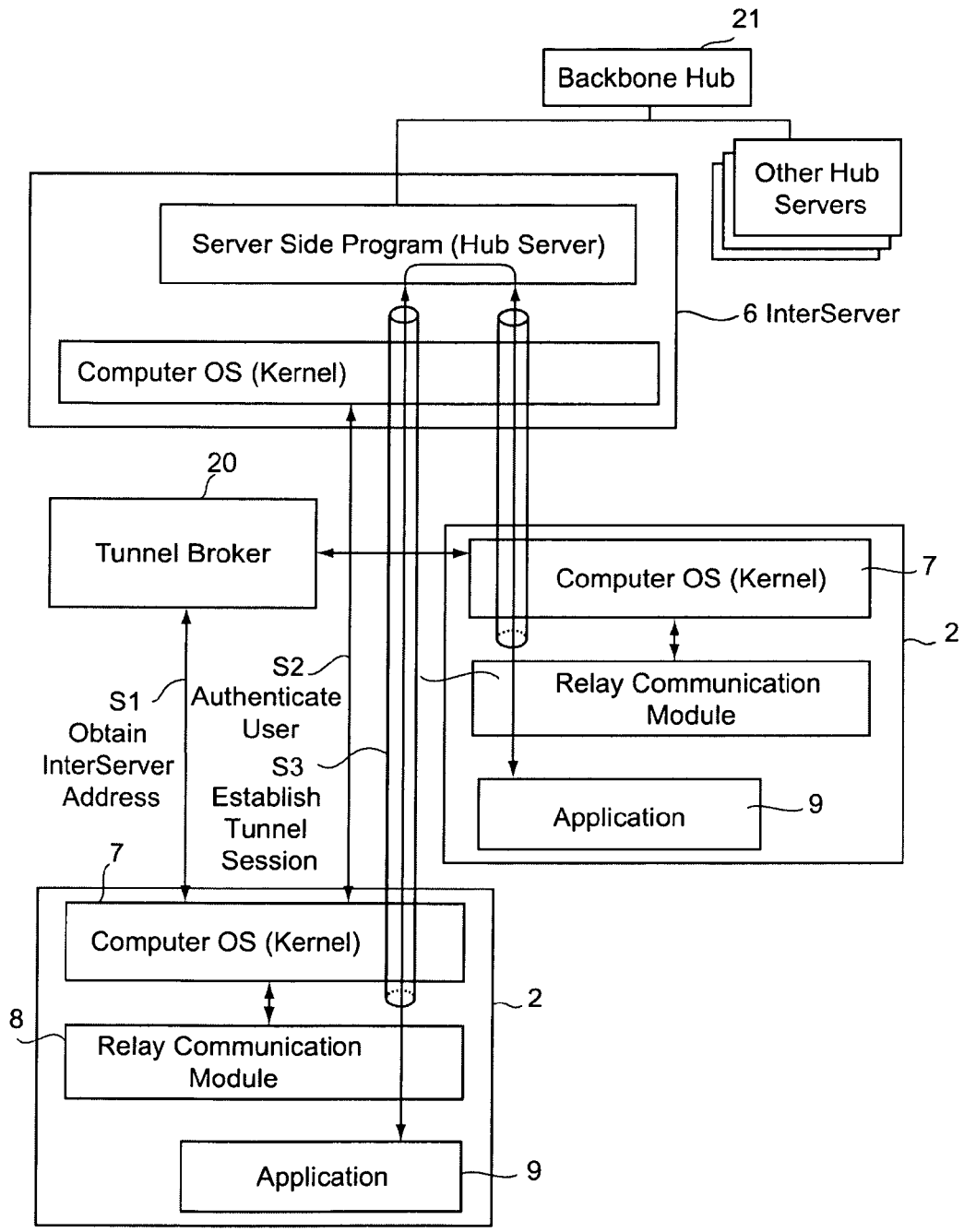
FIG. 3 is a block diagram showing a communication sequence according to the one embodiment.

Next operations of the communication module 8 will be discussed with respect to FIGS. 2 and 3.

When the application software program 9 launches, the relay communication module 8 is read into a memory according to an instruction from the application software program 9. Then the tunneling application 19 in the relay communication module 8 first connects with a tunnel broker 20 in Step S1 as shown in FIG. 3. This tunnel broker 20 selects an InterServer 6 as a tunnel connection destination from an address database (not shown) and notifies the relay communication module 8 of an IPv4 address of this InterServer 6. Thus the relay communication module 8 may identify the Interserver 6, and after the user authentication (step S2), the relay communication module 8 may establish the tunneling session and communicate using MAC and IP addresses for the application software program 9 received from the InterServer 6 (step S3).

In other words, once the application software program 9 is activated and the relay communication module 8 connects with the InterServer 6, the authentication is performed to establish the connection and then the InterServer 6 provides the relay communication module 8 with the MAC and IP addresses assigned for a virtual private network for the application software program 9 (these MAC and IP addresses may alternatively be assigned by the tunnel broker 20). The relay communication module 8 retains these MAC and IP addresses as data in a memory.

Note that, according to one embodiment, the application software program 9 recognizes programs on the InterServer 6 side as one hub on the virtual network. That is, the InterServer 6 is configured so as to assign a hub for each group and this assignment is called "grouping" in the present invention. When there are a plurality of InterServers 6, it is possible that application software programs 9 or network terminals which should belong to the same virtual private network are connected to different InterServers 6 but in this case, these connections are preferably routed by a backbone hub server 21 for managing a grouped a plurality of InterServers 6 or a plurality of server programs (hub server). Hereafter, such connections will be called "hub connections" (or "Layer 2 connections").

In contrast to the above Layer 2 connection, the relay communication module 8 is configured to be capable of forming a PPP connection (or "Layer 3 connection") with the InterServer 6. The above Layer 2 and 3 connections are switched by an initialization section indicated with 23 in FIG. 2. This initialization section 23 performs an initialization process based on an argument for indicating either the Layer 2 or 3 connection, which argument passed from the application software program 9. In this initialization process, for example, predetermined tunnel broker 20 and InterServer 6 are elected depending on the argument to establish a connection. Also in the case of the Layer 2 connection, the initialization section 23 generates all of the Layer 2, 3 and 4 protocol stacks, and in the case of the Layer 3 connection, generates only the Layer 3 and 4 protocol stacks, but not the Layer 2 protocol stack.

Moreover, although the network connection method and relay device disclosed in the International Application No. PCT/JP2005/9280 (Publication No. WO2005/114926), previously filed by the present assignee, used two pseudo MAC addresses in order to manipulate MAC addresses in the Layer 2 connection, the present embodiment does not require such a process.

As described above, the International Application No. PCT/JP2005/9280 has interfaces, each of which are regarded as a virtual device driver and all of which are assigned with an identical MAC address, requiring rewrite of the MAC address on the packet as needed in order to maintain the uniqueness of the MAC address. In contrast, the relay communication module 8 of the present embodiment operates similarly to a real interface without requiring the rewrite of the MAC address as in the virtual device driver. In other words, the relay communication module 8 assigns itself the MAC address obtained from the InterServer 6 and performs ARP request and response processes in the same manner as in the real interface.

Thus according to the present invention, there is provided a relay communication module 8 installed in the client device for connecting the application software program 9, installed in the client apparatus (network home appliance 2) on the local network, to the virtual network via the server on the Internet (InterServer 6). This relay communication module 8 interposes between the application software program 9 in a computer and the group of local communication protocol stacks (11-14) of the OS 7 installed in the same computer; retains the virtual network address for the application software program 9; and performs the tunneling processing on packets from the application software program 9 to the virtual network to thereby pass the processed packets to the InterServer 6 through the local communication protocol stacks (11-14). Also this relay communication module 8 is provided with the Layer 2, 3 and 4 protocol stacks (15-18) required by the application software program 9 for communication via the virtual network, wherein the Layer 2, 3 and 4 protocol stacks (15-18) are independent of the group of local communication protocol stacks (11-14).

According to such a structure in which the Layer 2, 3 and 4 protocol stacks (15-18) are independently provided of the local communication protocol stacks (11-14) of the OS 7, network application software programs (such as the application software program 9) may be created for communicating independently of any particular network environment determined by the OS and the like. In other words, even on an OS without a particular protocol stack installed, application software using that particular protocol may be executed. For example, even in an OS environment with no IPv6 protocol available, it is possible to create application software using IPv6 on an application-to-application basis.

In yet other words, the application software program 9 itself may be integrated with the relay communication module 8 of the present embodiment to operate as if it were one device with its own IP address independent of its client apparatus (interface).

Next, embodiment examples of the relay communication module 8 and the application software program 9 shown in the present embodiment will be described.

Figure 4:
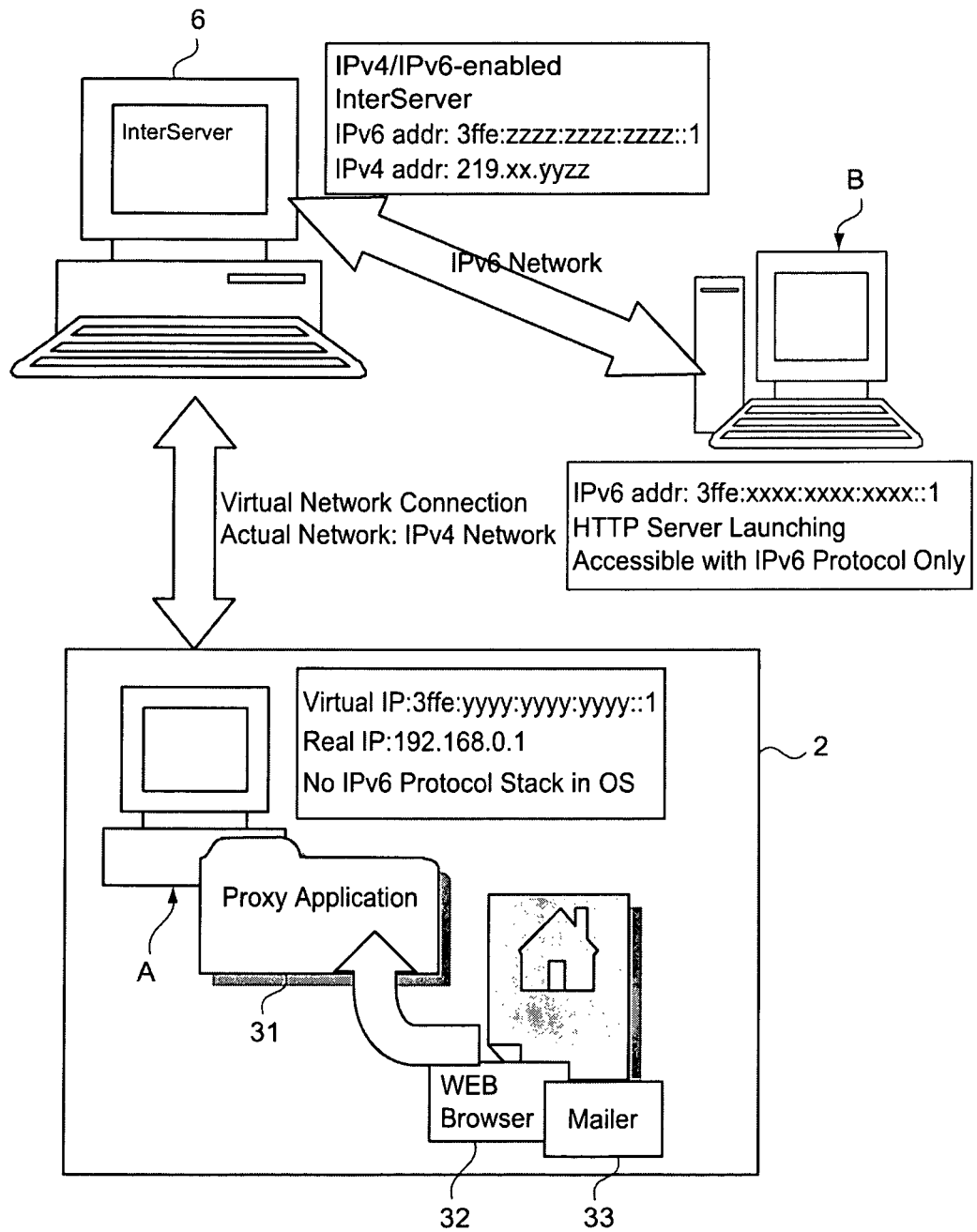
FIG. 4 is a schematic structural view of an embodiment example 1.

First, FIG. 4 indicates a form of communication by an IPv4/IPv6 application utilizing a relay communication module 8 of the following embodiment examples 1-3. In this case, the relay communication module 8 uses a TCP/IP (OS) on a client computer 2 to connect with an InterServer 6 via Internet (IPv4) and obtain an IPv6 address from the InterServer 6. The InterServer 6 may operate as a relay device between the IPv4 and IPv6 protocols on the Internet and the relay communication module 8 may use IPv6 by directly communicating with the InterServer 6 by tunneling. Therefore, even without the IPv6 protocol on the client computer 2, application software program 9 uses the relay communication module 8 to connect to and communicate with a contents server 2c having Internet (IPv6) contents.

Embodiment Example 1

Figure 5:
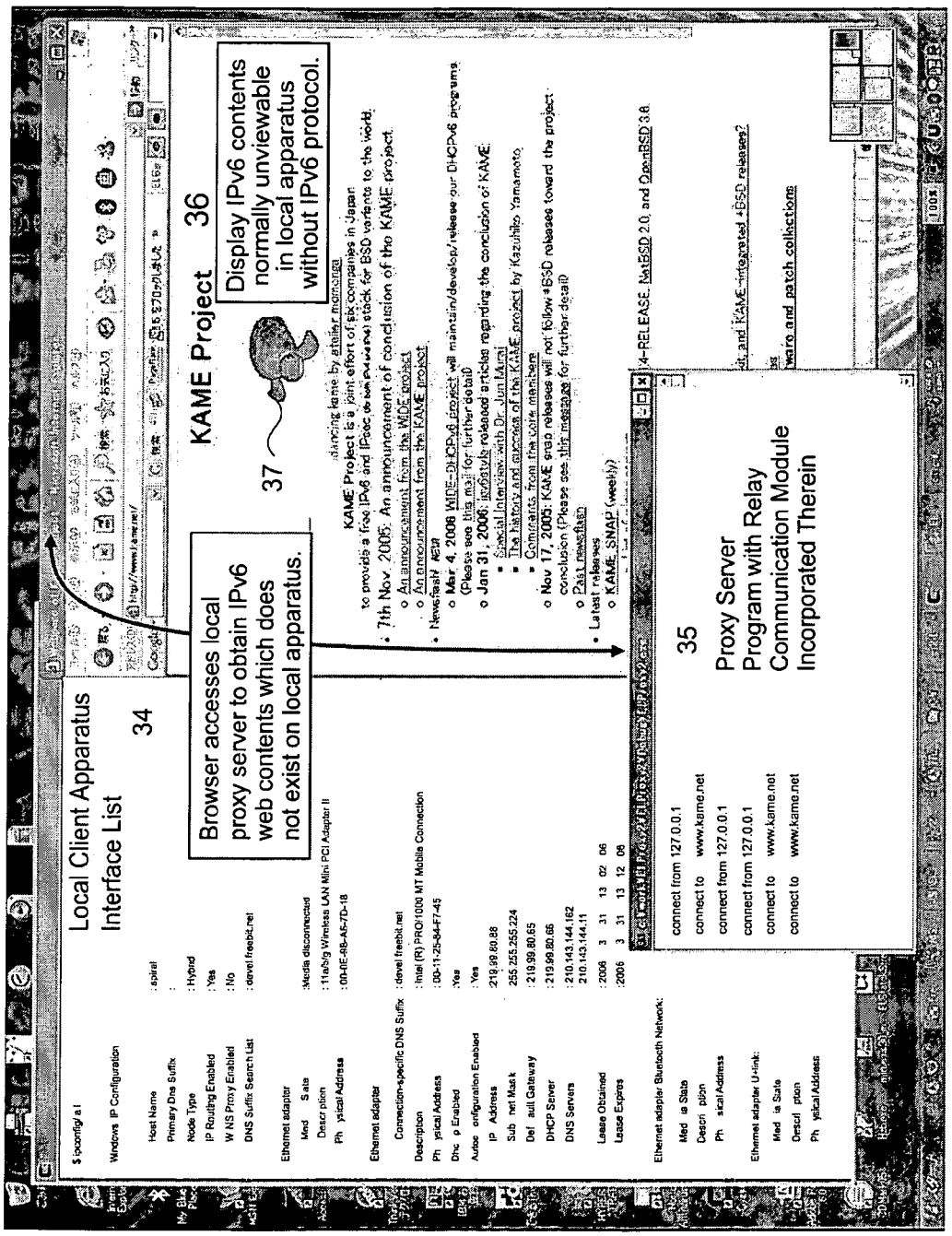
FIG. 5 is a screen shot showing an operational state of the embodiment example 1.

The embodiment example of FIG. 5 is indicating an IPv4/IPv6 application proxy utilizing the relay communication module of the present embodiment.

In this example, the client apparatus is a personal computer (denoted as "A" in the figure) connected to a local network (IPv4) such as LAN. Installed in this client apparatus A is a proxy server program (proxy) 31 provided with the relay communication module.

When a user on this client apparatus A connects with the proxy 31 using, for example, a browser 32 or an email software 33, the proxy 31 connects with a virtual network via the InterServer 6. If this InterServer 6 is connected to an IPv6 network, the client apparatus A can connect with the IPv6 network through the InterServer 6 and have an IPv6 address to perform communication via the virtual network per each application software (in this case, proxy 31) even in the OS environment without the IPv6 protocol. In this manner, the client apparatus A can, for example, download contents obtainable only under IPv6 from a server B operating with IPv6.

Figure 6:
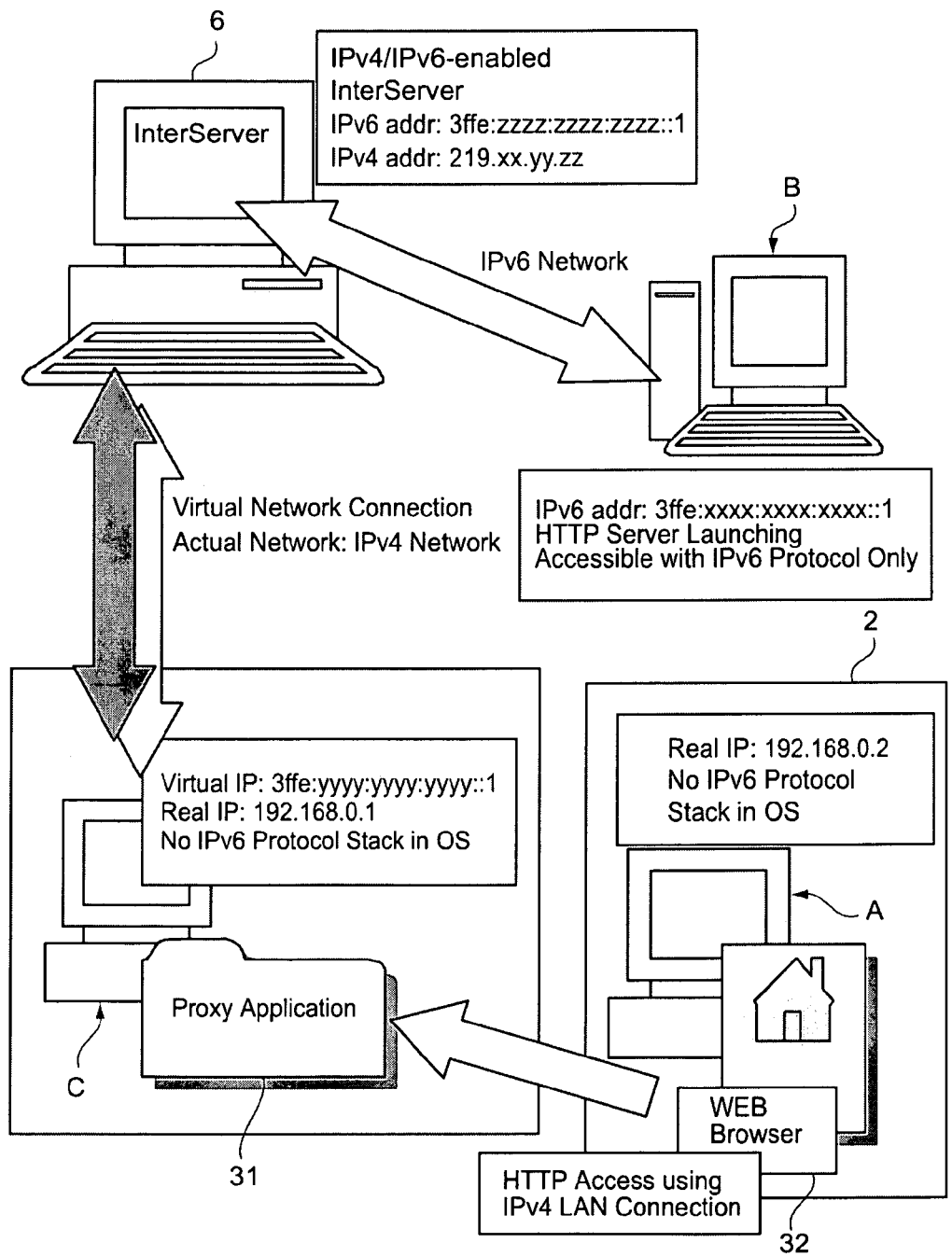
FIG. 6 is a schematic structural view of an embodiment example 2.

FIG. 6 is an actual screen shot showing an operational example of the client apparatus A in the present embodiment example 1.

Indicated with 34 in this figure is a window with a list of interfaces of the client apparatus A displayed using the ipconfig/all command. This list is indicating that the IPv6 protocol does not exist in the OS of this client apparatus A.

Denoted with 35 in the figure is a window showing the operational state of the proxy server program having the relay communication module incorporated therein.

Also indicated with 36 in the figure is a browser on the display screen showing a website having contents browsable only under the IPv6 environment. As shown in the window 35, the relay communication module (proxy) is accessing the website via the InterServer 6 using a private address assigned to this relay communication module (proxy).

At the website, a moving turtle is displayed only when the connection is under IPv6. Although this figure is not clear enough to show it, the head of the turtle 37 on the browser 36 is directed towards the screen viewer, verifying its motion.

Although the application software program was a browser in the previous embodiment, the application software program is a proxy program in this embodiment example 1. According to such a structure, the above operation may be achieved simply by configuring the proxy rather than altering the browser software.

Embodiment Example 2

Figure 7:
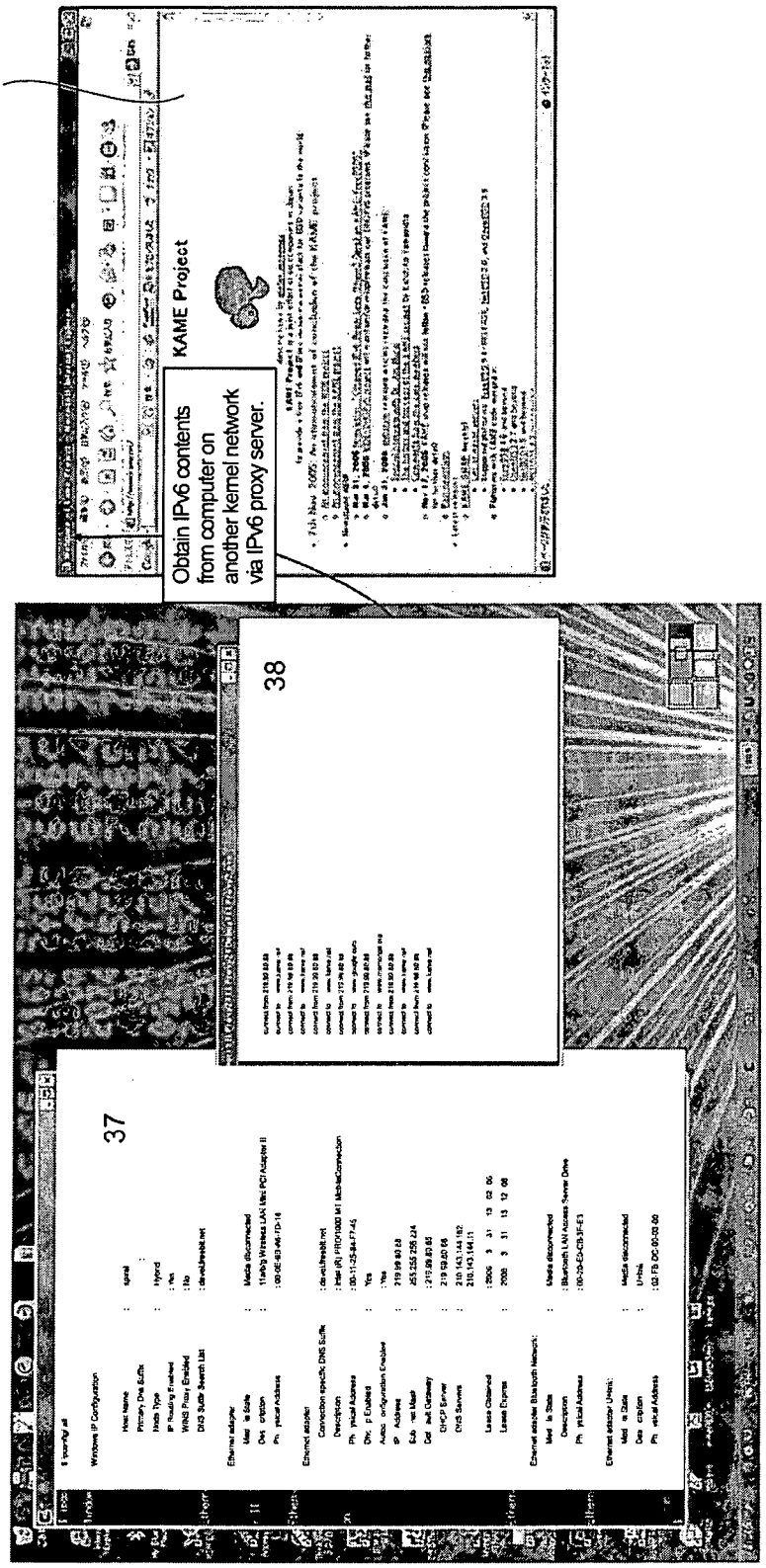
FIG. 7 is a screen shot showing an operational state of the embodiment example 2.

FIG. 7 is an example where the proxy application 34 is provided on an another server C on the Internet or on another local network separate from the client apparatus. According to such a structure, the client apparatus A can, for example, download IPv6 contents from the server B in a manner similar to the embodiment example 1 via the proxy 34 of the server C even with no relay communication module included in itself.

Figure 8:
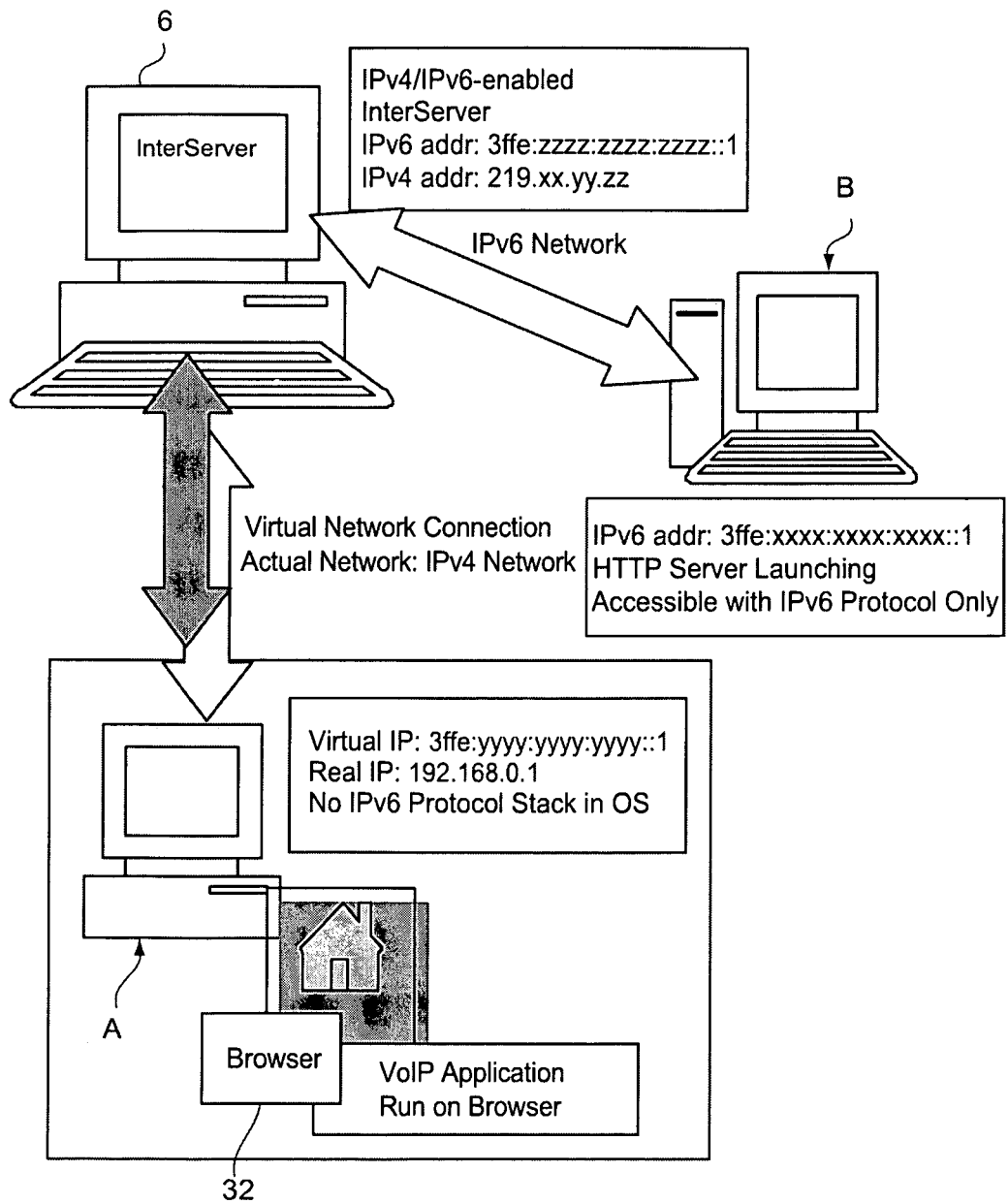
FIG. 8 is a schematic structural view of an embodiment example 3.

FIG. 8 is an actual screen shot showing an operational example of the client apparatus A in the present embodiment example 2.

In the figure, a reference number 37 denotes a window displaying a list of interfaces on the server C. This list is indicating that the IPv6 protocol does not exist in the OS of this server C.

Also indicated with 38 in the figure is a window showing the operational state of the proxy server program having the relay communication module incorporated therein. Additionally indicated with 39 in the figure is a browser on the display screen of the client apparatus A showing a website having contents browsable only under the IPv6 environment. As shown in the window 38, the relay communication module (proxy) is accessing the website via the InterServer 6 using a private address assigned to this relay communication module (proxy).

According to such a structure, the client apparatus A can download contents browsable only under the IPv6 environment even with no relay communication module installed in itself.

Embodiment Example 3

Figure 9:
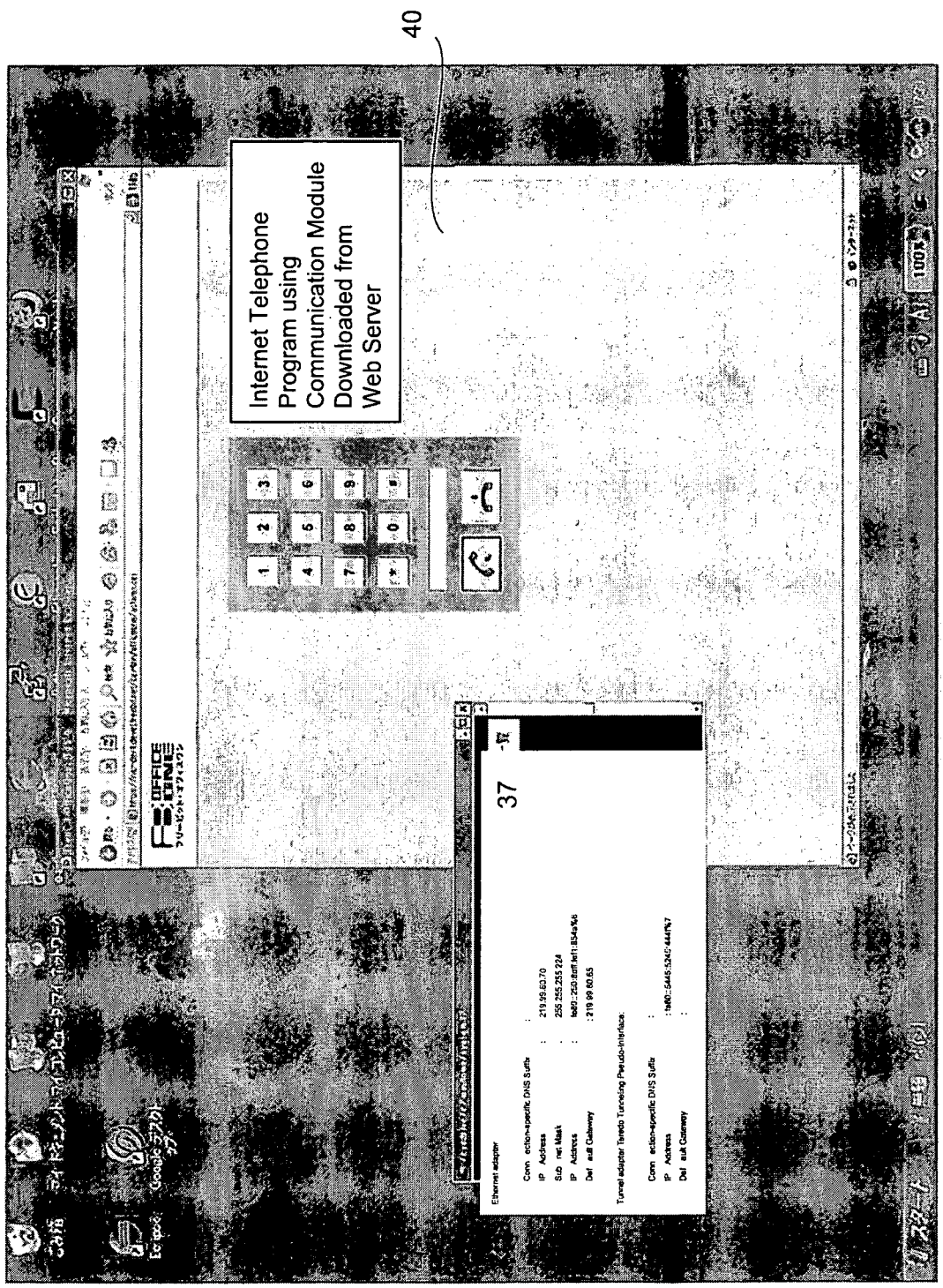
FIG. 9 is a screen shot showing an operational state of the embodiment example 3.

FIG. 9 is an example in which the present invention is applied to a VoIP program such as an Internet telephone and is showing a display screen of a client apparatus. In this embodiment example, when the user connects from a client apparatus A to a web server B on the Internet, the VoIP program is downloaded as a web page to this client apparatus A. When the browser 32 executes the VoIP program, the relay communication module is installed on this client apparatus A to establish a connection with the InterServer 6 via this relay communication module, providing the VoIP program (browser) with an IP address for a virtual network. This allows the communication using the VoIP program.

In FIG. 9, a reference number 37 indicates a window displaying a list of interfaces on the server C. This list is indicating that the IPv6 protocol does not exist in the OS of this server C. Also denoted with 40 in the figure is a telephone program executed on the browser 32. Since this program is assigned with an intrinsic IP address regardless of the OS communication interface and capable of bidirectional communication through the InterServer 6, it can transfer the VoIP signals on the Internet.

Here, the VoIP program is a telephone program, instant messenger, or the like installed on a client computer but not limited to these examples. Also the client apparatus is not limited to a computer and may be an application software program incorporated in the hardware.

Figure 10:
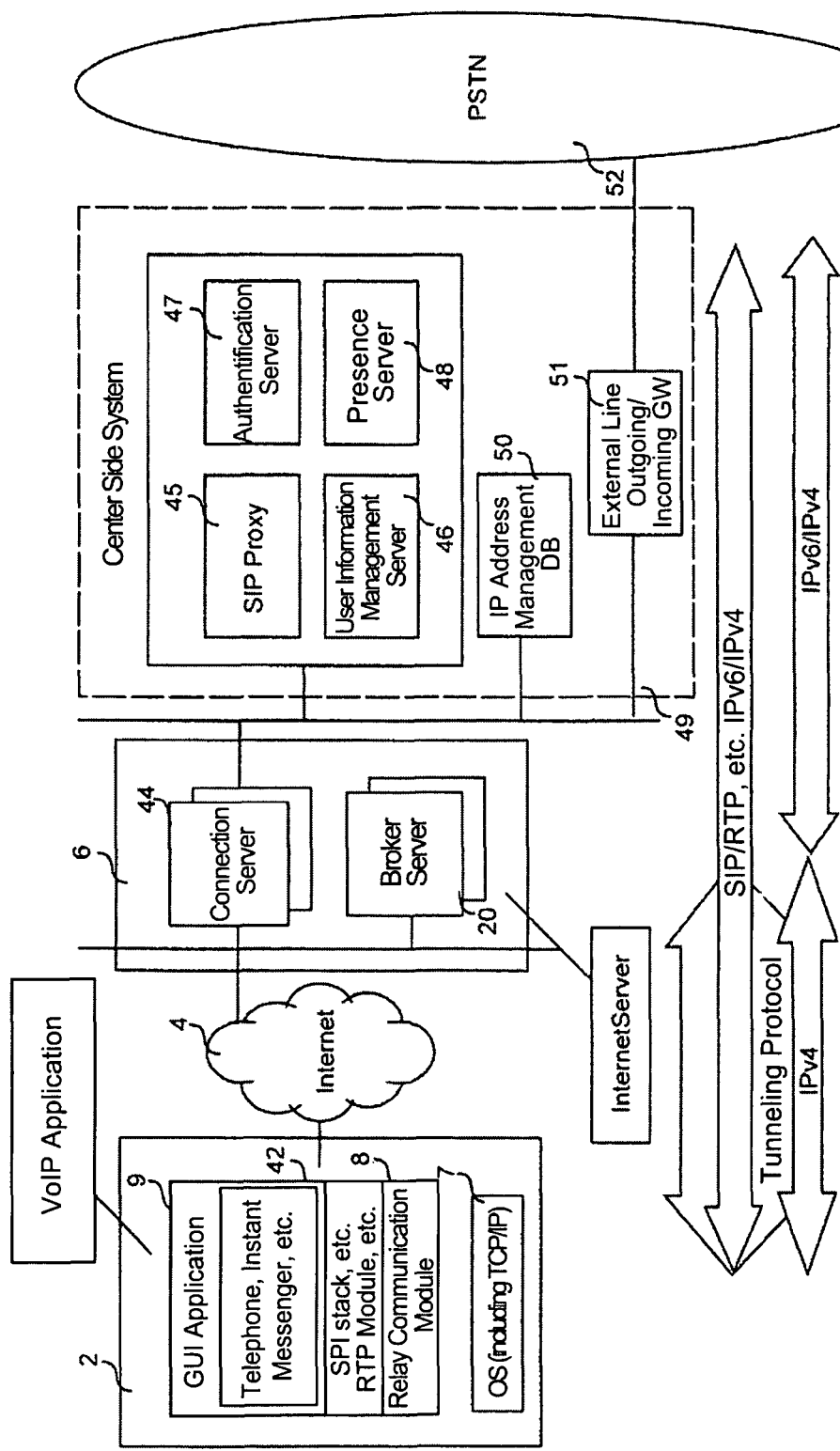
FIG. 10 is a diagram showing details of a system structure of the embodiment example 3.
Figure 11:
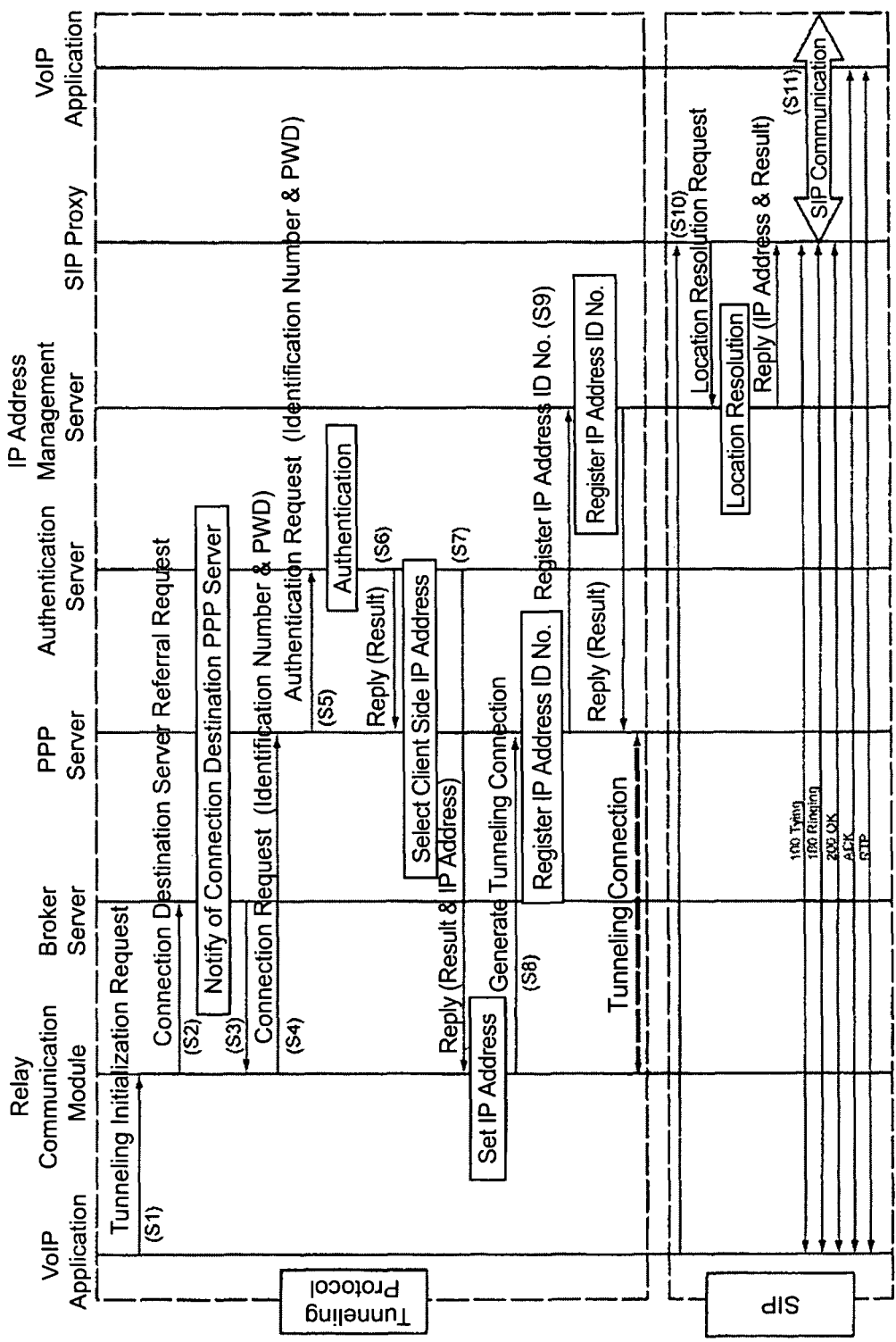
FIG. 11 is a process diagram showing the steps of establishing communication between the VoIP applications according to the embodiment example 3.

FIG. 10 is a diagram showing details of a system structure of the present embodiment example; and FIG. 11 is a process diagram showing the steps of establishing communication between the VoIP applications according to this system.

In FIG. 10, the InterServer 6 supports the Layer 3 connection between a center-side system 43 and the client apparatus and controls communication between Internet telephones utilizing SIP and between the instant messengers. In other words, a VoIP program 9 on the client side has a signaling protocol such as SIP and a RTP module 42 for processing audio and the like the center-side system 43 is adapted to be capable of processing the signaling protocol such as SIP.

When performing audio communication between the VoIP programs respectively provided in two clients, audio communication with RTP or the like is processed through a path such as RTP module of the client application>relay communication module of one client>TCP/IP of the client OS>InterServer>TCP/IP of the client OS>relay communication module of the other client>RTP module of the client application.

Also in the InterServer an audio relay communication server may be provided for passing the communication therethrough. In this case, the communication processing path is RTP module of the client application>relay communication module of one client>TCP/IP of the client OS>InterServer>audio relay communication server>InterServer>relay communication module of the other client>RTP module of the client application.

For media communication of audio, image and the like with protocols such as SIP, client side applications perform location management (with IP addresses) by using identification numbers such as phone number and registering corresponding IP addresses, and perform address resolution when signaling. Accordingly, methods including the address registration are prepared for protocols such as SIP.

Utilizing this feature in the present invention, the VoIP application 9 includes the relay communication module 8 and manages IP addresses and identification numbers such as phone numbers using tunneling sessions established with the InterServer 6.

The above processing will be discussed in detail in reference to FIGS. 10 and 11.

First, as shown in FIG. 10, the InterServer 6 is provided with a connection server 44 as the end of a tunnel, and the center-side system 43 is provided with a SIP proxy server 45, a user information management server 46, an authentication server 47 and a presence server 48. Also this center-side system may connect to an IP address management DB 50 and an external line outgoing/incoming gateway 51 (and to a public switched telephone network 52 therethrough) via a private network 49.

As described above, the VoIP application 9 provided in the client computer 2 establishes the tunneling connection directly with the connection server 44 of the InterServer 6 via the relay communication module 8, but not via the OS. Accordingly, assigned with an IP address for the virtual network, the VoIP program 9 may use this IP address to perform audio communication with the tunneling session through the center-side system 43.

In other words, as shown in FIG. 11, when the VoIP application issues a tunneling initialization request to the relay communication module (Step S1), the relay communication module connects to a predetermined broker server (Step S2) and receives an IP address (or domain name) of the InterServer used for the VoIP communication (Step S3). With this the relay communication module learns the InterServer address and to thereby connect to the connection server of the InterServer with login information such as identification number and password so that this relay communication module may be authenticated by the authentication server (Steps S5, S6). Upon this authentication, an IP address is selected for the VoIP application (client) and returned to the relay communication module of the client (Step S7).

Next the relay communication module uses the received IP address and the IP address of the InterServer 6 to directly establish a tunneling session with the connection server of the InterServer (Step S8). After the tunneling session is established, the InterServer 6 registers the client IP address in association with the client identification number in the IP address management server (Step S9).

Thus the tunneling connection is established and simultaneously the IP address and identification number of the VoIP application 9 registered to permit the audio communication.

In other words, when the SIP proxy server or the like receives the audio communication INVITE (Step S9), it may refer to the IP address management DB where the InterServer registered the login information to thereby perform the signaling (location resolution) (Step S10) and relay the audio communication (Step S11).

According to such a structure, first the VoIP application itself and the relay communication module of the present invention become integrated to operate as if they are one device with its own IP address independent of its client apparatus interface. In addition, the communication and management efficiency may be improved by performing the location management under the SIP protocol using the IP address used between the relay communication module and the servers.

It should be mentioned that the present invention is not limited to the above one embodiment and that various changes and modifications can be made, without departing from the scope and spirit of the present invention.

For example, although the application software program was the browser, Internet, telephone program or proxy program in the above one embodiment, it is not limited to these examples and may be applied to any application software programs requiring bidirectional communication.

In addition, although the tunnel broker was adapted to select the InterServer in the above one embodiment, this selection may be configured in each communication relay module.

Further, the communication module of this embodiment operates completely in user mode (programs such as drivers typically operates in kernel mode) to offer excellent portability among OS's which permit the creation of TCP/IP applications and, therefore, the communication module of this embodiment may be applied to OS's other than the one described above, for example, proprietary OS's in home appliances employed by respective manufacturers and ones employed in commercial equipment such as cash registers.

What is claimed is:

1. A non-transitory computer readable medium having stored computer-executable instructions comprising:
   a communication module, installable in a client apparatus on a local network that enables an application software program installed in said client apparatus to connect to a virtual private network via a server on the Internet,
   wherein the communication module enables said corresponding application software program to connect to the virtual private network, said corresponding application software program assigned a unique virtual private network address by said server on the Internet;

wherein said communication module interposes between said application software program and a group of local communication protocol stacks of an operating system of said client apparatus; retains the virtual private network address uniquely assigned to said application software program by said server on the Internet; performs a tunneling processing on packets from said application software program to the virtual private network destined to thereby pass the processed packets to said server on the Internet through the local communication protocol stacks;

wherein said communication module is provided with protocol stacks required for said application software program to communicate via the virtual private network, independently of said group of local communication protocol stacks; and wherein said communication module stores a global address of the server on the Internet and establishes a tunneling connection between the communication module and the server based on the global address of the server.

2. The non-transitory computer readable medium of claim 1, wherein said communication module captures a request packet from the application software program, encapsulates the captured request packet after adding to the packet the virtual private network address of the application software program as an originating address to thereby send the capsulated packet to the server via the tunneling connection; and decapsulates a packet addressed to the communication module itself received through the local communication protocol stacks to pass the decapsulated packet to the application software program.

3. The non-transitory computer readable medium of claim 1, wherein said communication module connects to a tunneling mediation server provided on the Internet, and receives the global address of the server from the tunneling mediation server.

4. The non-transitory computer readable medium of claim 1, wherein the virtual private network address received from the server on the Internet and retained in the communication module is an IP address for the virtual private network for said application software program.

5. The non-transitory computer readable medium of claim 1, wherein the virtual private network address received from the server on the Internet and retained in the communication module is MAC and IP addresses for the application software program to connect to the virtual private network.

6. The non-transitory computer readable medium of claim 1, wherein the communication module is provided as a library program callable from the application software program.

7. The non-transitory computer readable medium of claim 1, wherein said communication module has an initialization section in communication with said application software program configured to determine if said application program requires to establish a Layer 2 or a Layer 3 connection with the server, and generate all of Layer 2, 3 and 4 protocol stacks if it determines said application software program requires a Layer 2 connection with the server, and generate only the Layer 3 and 4 protocol stacks, but not the Layer 2 protocol stack if it determines that said application program requires a Layer 3 connection with said server.

8. A non-transitory computer readable medium storing an application software program having instructions that, when executed by a computer, cause the computer to connect to the Internet to perform predetermined processing, call and incorporate the communication module of claim 1 as a communication interface, wherein the application software program is configured to have an IP address independent of said computer.

9. The computer-readable storage medium of claim 8, wherein the application software program is a VoIP program for connecting to a virtual private network via a server on the Internet.

10. The computer-readable storage medium of claim 8, wherein the application software program is a proxy for connecting a client apparatus to a virtual private network via a server on the Internet.

11. The computer-readable storage medium of claim 8, wherein the application software program is a VoIP application software program that utilizes a protocol, requiring address management and sharing the address management with IP address management for a tunneling protocol.

12. The computer-readable storage medium of claim 11, wherein said protocol is SIP.

* * * * *

UNITED STATES PATENT AND TRADEMARK OFFICE
CERTIFICATE OF CORRECTION

PATENT NO.        : 8,543,706 B2
APPLICATION NO.   : 12/301990
DATED             : September 24, 2013
INVENTOR(S)       : Niisato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 415 days.

Signed and Sealed this
Fifteenth Day of September, 2015

Michelle K. Lee
*Director of the United States Patent and Trademark Office*